(12) United States Patent
McKinney

(10) Patent No.: US 7,513,994 B2
(45) Date of Patent: Apr. 7, 2009

(54) AERATION VESSEL AND AERATOR ASSEMBLY FOR USE IN A WASTEWATER TREATMENT SYSTEM

(75) Inventor: Jerry L. McKinney, Silsbee, TX (US)

(73) Assignee: Jerry L. McKinney 2002 Trust, Silsbee, TX (US)

( * ) Notice: Subject to any disclaimer, the term of this patent is extended or adjusted under 35 U.S.C. 154(b) by 445 days.

(21) Appl. No.: 11/262,862

(22) Filed: Oct. 31, 2005

(65) Prior Publication Data

US 2007/0095737 A1 May 3, 2007

(51) Int. Cl.
*C02F 3/18* (2006.01)
*B01F 3/04* (2006.01)

(52) U.S. Cl. .................... 210/207; 210/220; 210/221.2; 210/170.06; 210/170.08; 261/121.1; 261/122.1; 261/DIG. 47

(58) Field of Classification Search .................. 210/220, 210/221.2, 207, 170.06, 170.08; 261/121.1, 261/122.1, DIG. 47

See application file for complete search history.

(56) References Cited

U.S. PATENT DOCUMENTS

| 4,294,696 | A | * | 10/1981 | Thayer | .................. 210/220 |
| 5,221,470 | A | | 6/1993 | McKinney | |
| 5,266,239 | A | | 11/1993 | Drewery | |
| 5,770,081 | A | | 6/1998 | McKinney | |
| 5,785,854 | A | | 7/1998 | McKinney | |
| 6,358,411 | B1 | | 3/2002 | McKinney | |
| 6,702,263 | B2 | * | 3/2004 | Kelly | .................. 261/122.1 |
| 7,178,677 | B1 | * | 2/2007 | McKinney | .................. 210/513 |
| 7,294,260 | B2 | * | 11/2007 | McKinney | .................. 210/220 |
| 7,294,261 | B2 | * | 11/2007 | McKinney | .................. 210/220 |

* cited by examiner

*Primary Examiner*—Duane S Smith
*Assistant Examiner*—Douglas J Theisen
(74) *Attorney, Agent, or Firm*—Browning Bushman P.C.

(57) ABSTRACT

An aerator assembly for use in the aeration vessel of a wastewater treatment system comprising a rigid tubular member having an upper end and a lower end, and a diffuser assembly, the diffuser assembly comprising a flexible connector and a diffuser head, the flexible connector connecting the diffuser head to the lower end of the rigid tubular member and providing a fluid flow path between the tubular member and the diffuser head, the upper end of the rigid tubular member being adapted to be connected to a source of an oxygen-containing gas such as air.

22 Claims, 3 Drawing Sheets

AERATION VESSEL AND AERATOR ASSEMBLY FOR USE IN A WASTEWATER TREATMENT SYSTEM

BACKGROUND OF THE INVENTION

1. Field of the Invention

The present invention relates to a wastewater treatment system. More particularly, the present invention relates to aeration vessels used in such systems and, in particular, to an aerator assembly for use in an aeration vessel.

2. Description of Prior Art

A typical wastewater treatment system of the type under consideration comprises a pre-treatment tank or vessel, commonly referred to as a trash tank, an aerobic or aeration treatment vessel, having an aeration chamber and a clarifier chamber formed by a partition in the aeration vessel, and a holding vessel, commonly referred to as a pump tank. In all aerobic wastewater treatment systems having an aeration or aerobic vessel, an oxygen-containing gas, e.g., air, is supplied to the liquid in the aeration vessel to promote aerobic digestion and generate substantially solid-free water. Typically, as shown in U.S. Pat. Nos. 5,770,081, 5,221,470, and 5,266,239, the oxygen-containing gas is supplied to the aeration chamber of the vessel through a rigid tube as shown in U.S. Pat. Nos. 5,770,081 and 5,221,470 or by virtue of flexible tubes such is shown in U.S. Pat. No. 5,266,239. In the case of the aeration vessels shown in U.S. Pat. Nos. 5,770,081 and 5,221,470, a rigid tube is mounted on the interior of the aeration vessel externally of the partition which divides the aeration vessel into the aeration chamber and the clarifier chamber. This allows a flexible hose with an aerator head to be threaded into the rigid tube and positioned in the aeration chamber of the aeration vessel. Generally speaking, aeration vessels have a top with an access cover or hatch which is of relatively small diameter and which allows access to the interior of the aeration vessel for maintenance purposes and for installation of the aerator assemblies which, as noted above, either are in the form of flexible drop lines which hang down into the aeration vessel or are flexible lines threaded through rigid conduits mounted on the inside of the aeration vessel. As noted above, the aerator assemblies are suspended in the aeration vessel exteriorly of the partition generally adjacent the outside wall of the aeration vessel. In either case, positioning the aerator assemblies into the aeration vessel is somewhat time-consuming and difficult since it is necessary to reach through the opening on the top of the aeration vessel, and either thread the flexible drop line through the rigid conduits on the inside or suspend the flexible drop lines in the vessel.

SUMMARY OF THE INVENTION

In one preferred aspect, the present invention provides an aeration vessel for use in an aerobic wastewater treatment system, the aeration vessel having a bottom wall, a side wall, a top, and a partition disposed in the aeration vessel, the partition having a downwardly opening mouth, and serving to divide the aeration vessel into an aeration chamber and a clarifier chamber. The clarifier chamber is located inwardly of the partition while the aeration chamber is in the annulus between the side wall and the partition. An aerator assembly according to the preferred embodiment of the present invention extends into the clarifier chamber and through the mouth, and comprises a rigid tubular member having an upper end which can be connected to a source of an oxygen-containing gas and a lower end. A diffuser assembly comprised of a flexible connector is connected, on one end, to the lower end of the rigid tubular member, the flexible connector on its other end being connected to a diffuser head. The flexible connector provides a fluid flow path whereby the diffuser head is in open fluid communication with the rigid tubular member. Thus, air or the like pumped into the rigid tubular member passes into the diffuser head and emerges as fine bubbles. The diffuser assembly has a weight sufficient to maintain the diffuser head generally parallel to the bottom wall of the aeration vessel when air is being introduced into the diffuser head.

In another preferred embodiment of the present invention, there is provided an aerator assembly for use in the aeration vessel of an aerobic wastewater treatment system, the aerator assembly comprising a rigid tubular member having an upper end and a lower end and a diffuser assembly, the diffuser assembly comprising a flexible connector connecting a diffuser head to the lower end of the rigid tubular member, the flexible connector providing a fluid flow path between the diffuser head and the rigid tubular member.

DESCRIPTION OF THE PREFERRED EMBODIMENTS

Figure 1:
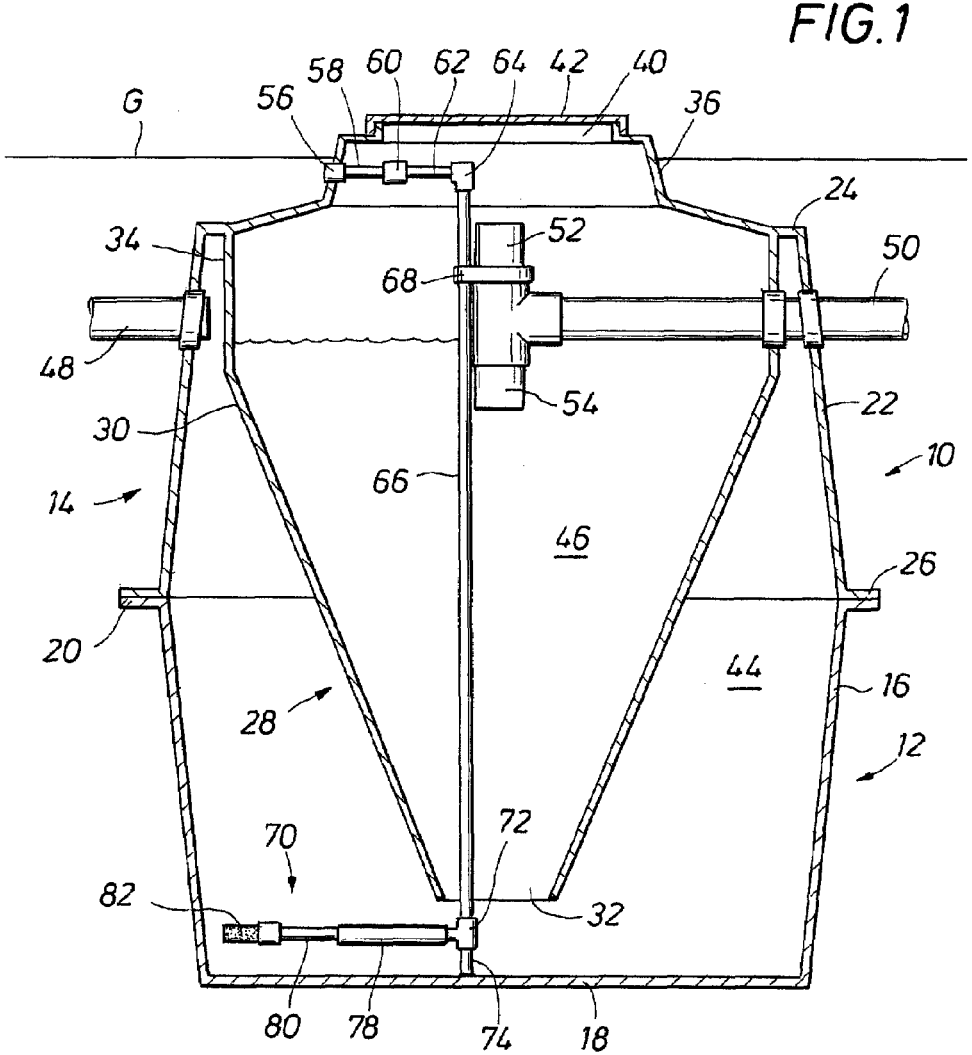
FIG. 1 is an elevational view, partly in section showing an aeration vessel and aerator assembly in accordance with a preferred embodiment of the present invention.

Referring first to FIG. 1, there is depicted a typical aeration vessel which can be used in an aerobic wastewater treatment system. The aeration vessel, shown generally as 10, is comprised of a lower section shown generally as 12 and an upper section shown generally as 14. Lower section 12 has an inverted frustroconical side wall 16, a generally planar bottom wall 18, and a peripherally extending flange 20 at the upper end of frustroconical side wall 16.

Upper section 14 is comprised of a frustroconical side wall 22, a top 24, and a peripherally extending flange 26, flanges 26 and 20 being sealingly engaged with one another by means of adhesive, gaskets, etc. As shown, top 24 has a neck portion 36 in which is formed an access opening 40, a selectively removable hatch 42 being received over access opening 40. As can be seen in FIG. 1, neck 36 protrudes slightly above ground level G, such that cover or hatch 42 can be accessed for maintenance once the aeration vessel 10 has been installed in ground.

Disposed in aeration vessel 10, is a partition shown generally as 28, partition 28 having an inverted frustroconical wall 30 with a downwardly opening mouth 32. Partition 28 in the embodiment shown in FIG. 1 also includes a generally cylindrical wall section 34.

In the embodiment shown and described herein, the aeration vessel is made of fiberglass or some other suitable plastic. However, it needs to be understood that the aeration vessel could be of concrete and of one piece construction. Additionally, while the aeration vessel 10 is described as having upper and lower sections with frustroconical walls, it will be appreciated that cylindrical walls or for that matter any other configuration of the walls could be employed as well.

As seen, partition 28 serves to divide aeration vessel 10 into a first or aeration chamber 44, and a second or clarifier chamber 46. A conduit 48 opens into aeration chamber 44, conduit 48 serving to convey fluid from a pretreatment tank into aeration vessel 10. Mounted through the wall 34 of partition 28 and the wall 22 of vessel 10 is an outlet conduit 50, outlet conduit 50 being connected to a T 52. T 52 has an open end 54 through which water from clarifier chamber 46 can flow into conduit 50 and hence into a pump tank or other means of disposal.

A fitting 56 is mounted in the neck 36 of top section 14, fitting 56 being connected to a tube 58 which in turn carries a quick disconnect 60, quick disconnect 60 being in turn releasably connected to a nipple 62. Nipple 62 is connected to an elbow 64 which in turn is connected to the top end of a rigid tubular member 66, tubular member 66, as seen, extending through clarifier chamber 46. Tubular member 66 is secured against movement in vessel 10 by means of a bracket 68 which is secured to T 52, bracket 68 serving to hold tubular member 66 in place once it has been positioned, as described hereafter, in aeration vessel 10. Fitting 56 is connected to a source of an oxygen-containing gas, e.g., air (not shown), in a manner well known to those skilled in the art such that air flow can pass through tube 58, quick disconnect 60, nipple 62, and elbow 64 into rigid tubular member 66.

Connected to the lower end of tubular member 66 is a diffuser assembly shown generally as 70. In the embodiment shown in FIGS. 1 and 2, diffuser assembly 70 comprises a tubular T fitting 72, the cross leg of T fitting 72 being connected on one end to the lower end of tubular member 66 and on the opposite end to a leg 74 having a cap 76 which rests against bottom wall 18. The other leg of the T fitting 72 is connected to a section of flexible tubing 78 which in turn is connected to a rigid, metal tubular member 80, tubular member 80 being connected to a diffuser head 82. Diffuser head 82, as is well known to those skilled in the art, is generally a cylindrical glass frit which is porous and can provide uniform bubble distribution of a desired size depending on the porosity of the frit.

Figure 2:
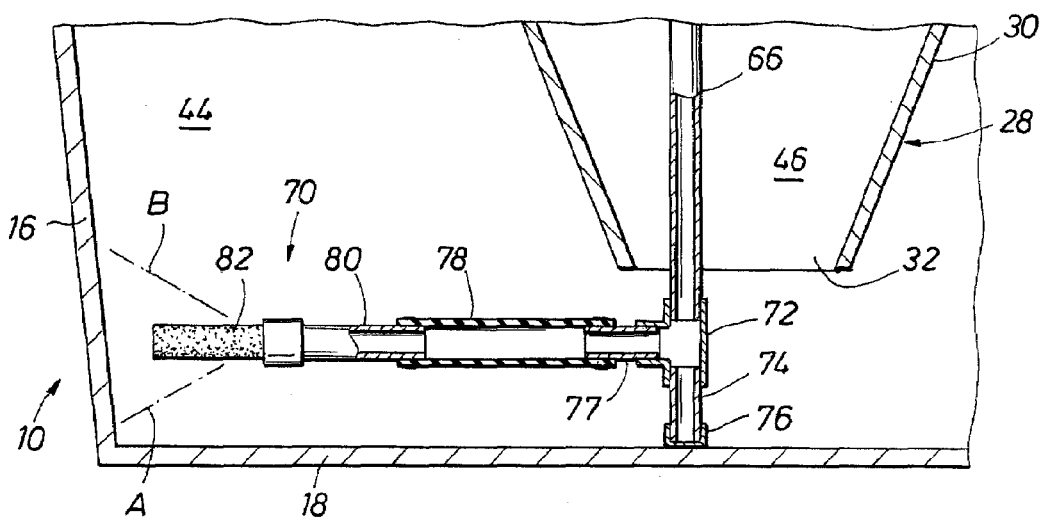
FIG. 2 is an enlarged, elevational view, partly in section showing in greater detail the diffuser assembly depicted in FIG. 1.

As seen in FIG. 2, diffuser assembly 70 is disposed in aeration vessel 10 such that diffuser head 82 is in aeration chamber 44. As is well known, an oxygen-containing gas in the form of air introduced through fitting 56 from a source not shown, after passing through tubular members 66, T fitting 72, nipple 77, flexible tubing 78 and tubular member 80 will be dispersed in the form of fine bubbles through the porous diffuser head 82. It is important that diffuser head 82 be positioned such that the air bubbles rise upwardly in aeration chamber 44 as opposed to rising upwardly in clarifier 46. In this regard, clarifier 46 is preferably maintained in a quiescent condition such that any solids which are not digested in aeration chamber 44 and which might pass through mouth 32 into clarifier chamber 46, will settle out on the bottom wall 18 of aeration vessel 10 to be subject to further aerobic digestion. As shown in FIG. 2, diffuser head 82 which is generally cylindrical in shape, has its long axis generally parallel to bottom wall 18. The term "generally parallel" or similar terms referring to the relative positioning of diffuser head 82 and bottom wall 18 is intended to include a variety of angular positions of diffuser head 82 relative to the generally planar bottom wall 18. Thus, and by way of example only, the long axis of diffuser head 82 as measured by an imaginary line passing therethrough could be at an angle passing through bottom wall 18 of from 120E to as large as 240E. These relative positions are indicated by dotted lines A and B, respectively, in FIG. 2. Generally, however, the angle will be closer to 180E, i.e., such that the long axis of diffuser head 82 is generally parallel to bottom wall 18. It will be recognized that this angular constraint of diffuser head 82 is to ensure a maximum dispersion of bubbles issuing from diffuser head 82 into the liquid in aeration chamber 44. It is also desirable that diffuser head 82 not be allowed to rest against bottom wall 18 to minimize turbulence as to any solids settled along bottom wall 18. As is well known to those in the art, air or other oxygen-containing gases being dispersed through diffuser head 82, impart a buoyancy to diffuser head 82 tending to force it upwardly into aeration chamber 44. Indeed, depending upon the flow rate and/or the flexibility of flexible tubing 78, the buoyancy effect could be such as to move diffuser head 82 such that a long axis passing therethrough would be nearly perpendicular to bottom wall 18. This is undesirable as it markedly decreases the dispersion of bubbles issuing from diffuser head 82 and hence impairs the aerobic digestion of solids in aeration chamber 44. With this in mind, and in the embodiment shown in FIG. 2, tubular member 80 may be of metal, the combined weight of diffuser head 82, tubular member 80, and the flexibility of flexible tubing 82 being such as to maintain diffuser head 82 in its angular disposition relative to bottom wall 18 as described above. It can readily be determined from the nature of flexible tubing 78 and the desired air flow through diffuser 82, what amount of weighting, if any, is necessary to maintain diffuser 82 in the angular disposition described above. For example, if given the dimensions of the aeration vessel, metal tubular section 80 was not of sufficient weight to maintain diffuser 82 in the desired angular disposition, then additional weight by any number of means could be attached to tubular member 80 to counter the buoyancy of diffuser 82 being imparted by the air issuing from diffuser head 82.

As seen in FIG. 2, leg 74 and the end cap 76 form a standoff which spaces diffuser assembly 70 from bottom wall 18. Additionally, leg 74 and end cap 76 serve to stabilize diffuser assembly 70 in aeration vessel 10. It will be recognized that internal supports or clamps such as bracket 68 could be mounted internally of partition 28 to further stabilize the aerator assembly and eliminate the need for tubular section 74 and end cap 76. In any event, such a standoff as provided by section 74 and end cap 76 serve the purpose of further ensuring that diffuser head 82 is not so close to bottom wall 18 as to cause turbulence in any solids on the bottom of the bottom wall 18. It should be remembered that excessive turbulence adjacent bottom wall 18 can result in solid, undigested particles rising through mouth 32 into clarifier 46. Although some solids will usually enter clarifier chamber 46 through mouth 32, the function of clarifier chamber 46 is to remain quiescent enough to permit any such particles or solids to settle out through mouth 32 onto bottom wall 18.

Figure 3:
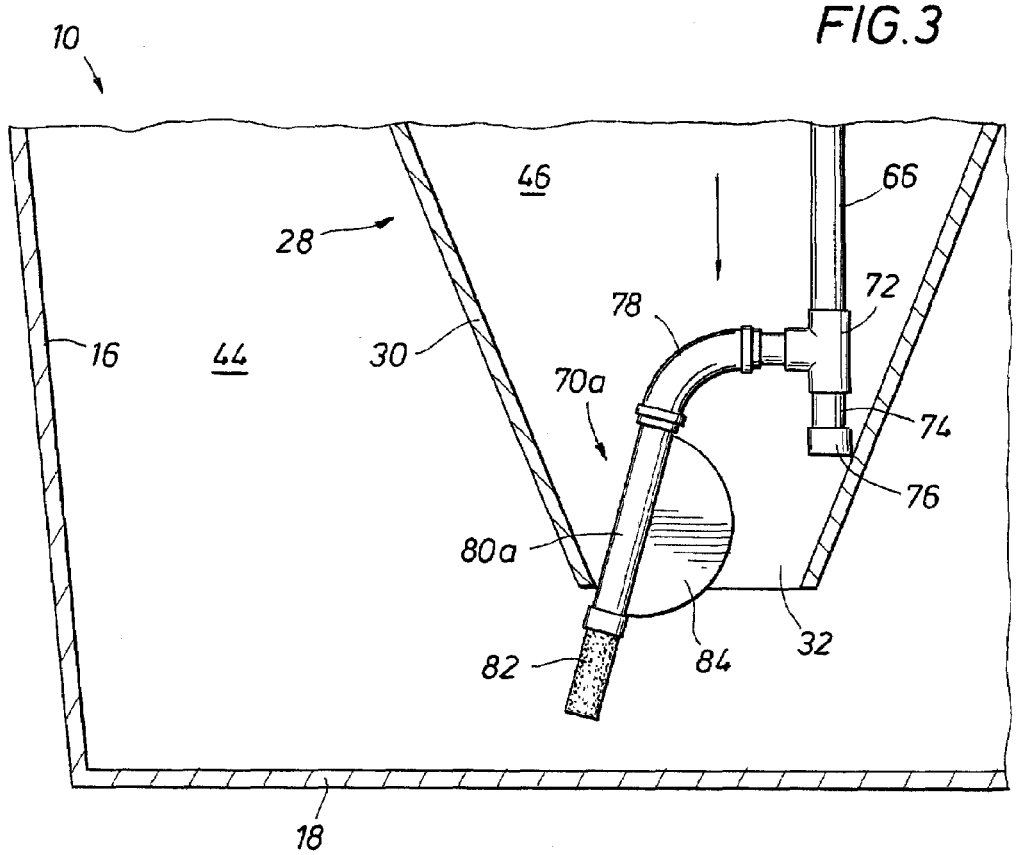
FIG. 3 is an enlarged, elevational view showing another preferred embodiment of the diffuser assembly of the present invention.
Figure 4:
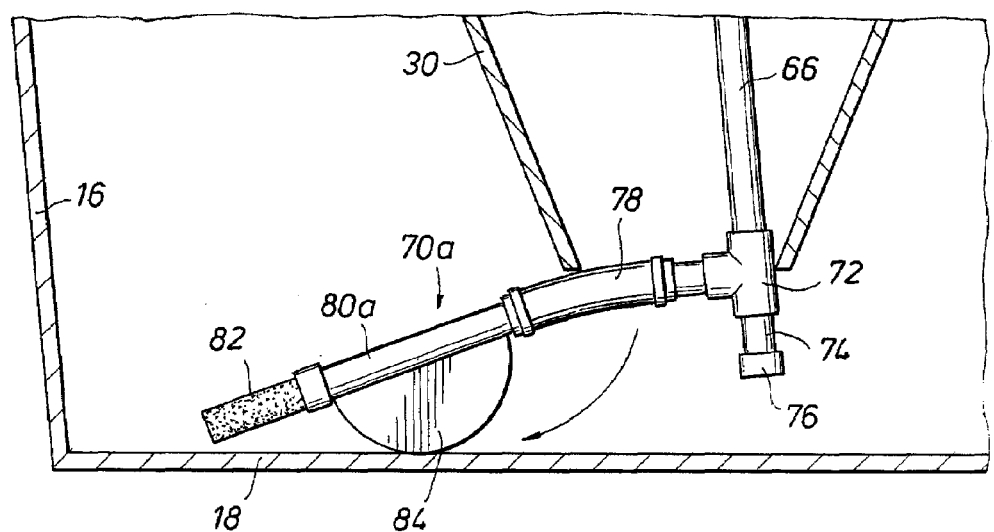
FIG. 4 shows the diffuser assembly depicted in FIG. 3 being positioned with the diffuser head in the aeration chamber.

Diffuser assembly 70a shown in FIG. 3 differs from diffuser assembly 70 shown in FIG. 2 in that metal tubular section 80a has attached thereto a semi-circular disc 84 which, as seen in FIG. 4 acts as a further standoff to position diffuser head 82 above bottom wall 18. FIGS. 3 and 4 also show how the flexible connector used in the embodiments of FIGS. 1-4 can be used to position the aerator assembly including rigid tubular member 66 through the clarifier chamber 46, out mouth 32 such that diffuser head 82 is substantially parallel to bottom wall 18. Standoff 84, in addition to separating or spacing diffuser head 82 from bottom wall 18 can also act as a weight, if further weight is needed other than is provided by metal tubular member 80a. Furthermore, metal tubular section 80a could be replaced by a polymeric tubular section and standoff 84 supply all the weight necessary to counteract excessive buoyancy of diffuser head 82 resulting from air issuing therefrom.

It will be appreciated with respect to viewing FIGS. 3 and 4, that the flexible connector 78 in the form of a flexible tubing, has to possess sufficient flexibility to allow diffuser assembly 70a to pass through mouth 32 and then return to a substantially straight condition such as, for example, shown in FIG. 2. In other words, when inserting the aerator assembly, tubing 78 must possess sufficient flexibility to allow aerator assembly 70a to pass through mouth 32 by initially bending to the extent necessary such that aerator assembly 70a is not generally perpendicular to tubular member 66 and, once any rigid portion of aerator assembly 70a, including diffuser head 82, passes through mouth 32, bend back such that aerator assembly 70a is again disposed generally perpendicular to tubular member 66, e.g., generally parallel bottom wall 18 as discussed above.

Figure 5:
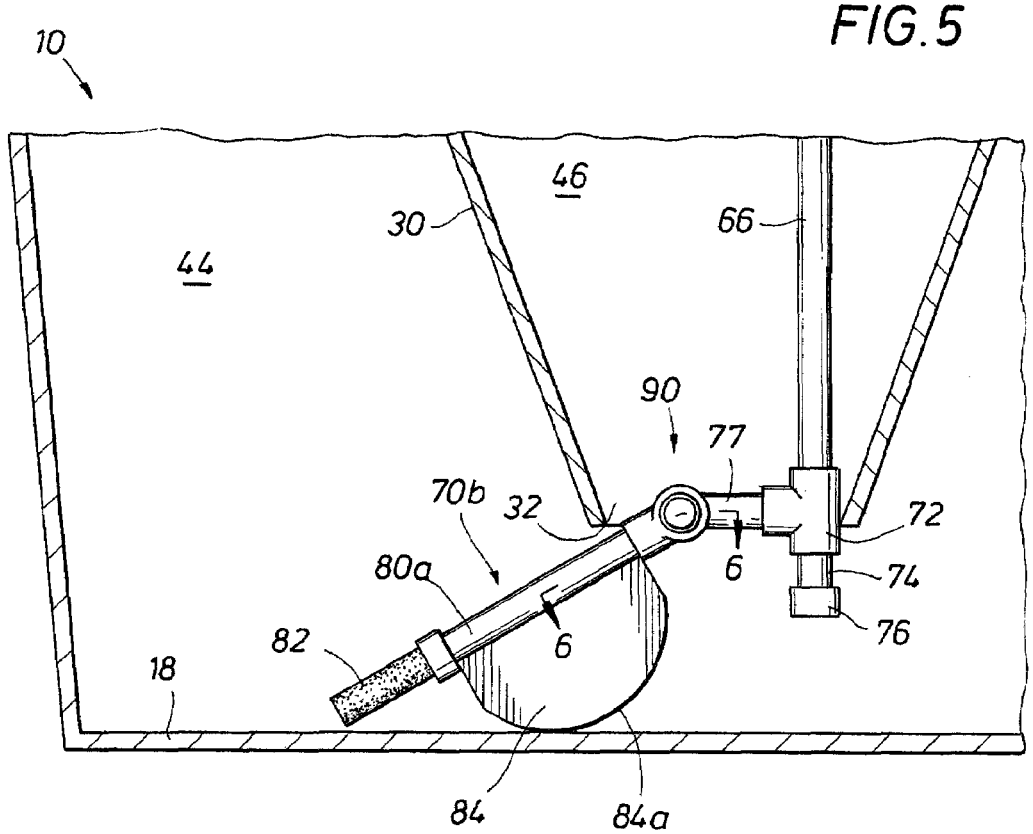
FIG. 5 is an enlarged elevational view showing another preferred embodiment of the diffuser assembly of the present invention.
Figure 6:
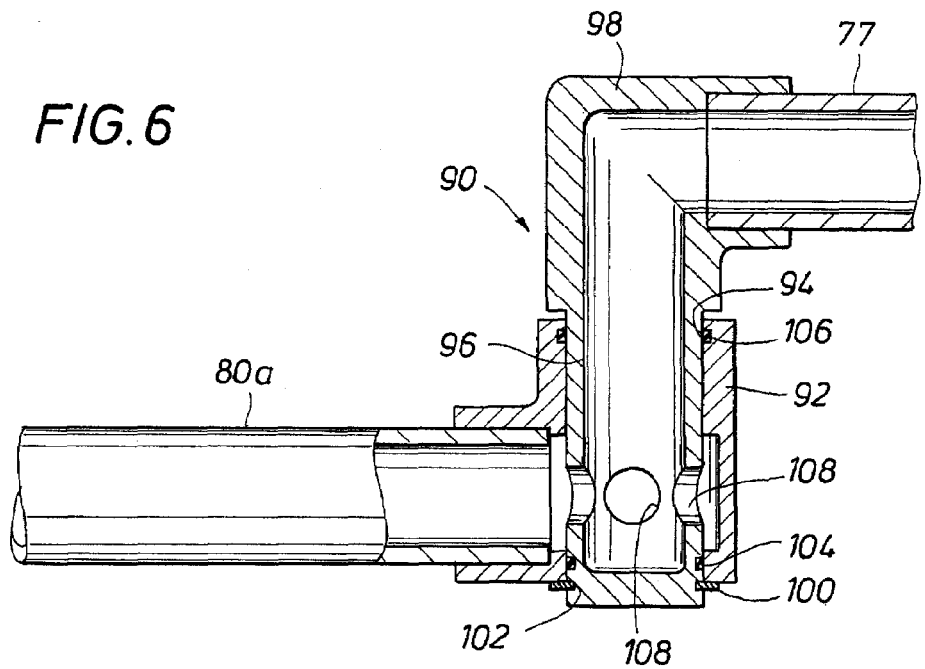
FIG. 6 is a view taken along the lines 6-6 of FIG. 5.

Referring now to FIGS. 5 and 6, there is shown another embodiment of the present invention. Diffuser assembly 70b differs from diffuser assembly 70 or diffuser assembly 70a, in that instead of a flexible connector such as a piece of flexible tubing being employed, a swivel assembly shown generally as 90 is used. Thus, diffuser head 82 is connected to tubular metal section 80a which in turn is connected to a tubular elbow 92, tubular elbow 92 having an opening 94 which is received over a reduced diameter portion 96 of a second elbow 98. Elbow 92 is free to rotate around reduced diameter portion 96 of elbow 98 and is held on reduced diameter portion 96 by a snap ring 100 received in a suitable groove 102 in reduced diameter portion 96. O-rings 104 and 106 received in appropriate grooves in elbow 92 provide a fluid seal between reduced diameter portion 96 and elbow 92. Ports 108 in reduced diameter portion 96 permit fluid communication between the interior of elbow 98 and the interior of elbow 92. Elbow 98 is connected to the bottom end of tubular member 66 by means of nipple 77 connected to T-fitting 72 as described above with respect to the embodiment shown in FIGS. 1-4. Thus, swivel 90 provides open fluid communication between tubular member 66 and aerator head 82. Considerations above regarding the weighting of aerator assembly 70b are likewise applicable to the embodiment shown in FIGS. 5 and 6. It will be appreciated that in the embodiment shown in FIGS. 5 and 6, swivel assembly 90, when first inserted into clarifier chamber 46 would permit diffuser head 82 to be somewhat in line with rigid tubular member 66. However, upon passing through mouth 32, the rounded surface 84a of standoff 84 would contact bottom wall 18 and allow diffuser head 82 to attain a position such as that of diffuser head 82 shown in FIG. 2.

As can be seen from above, a flexible connector can include any flexible tubing member and/or mechanical connection which allows sufficient flexure, pivoting or swiveling, as described above, to allow the diffuser assembly of the present invention to be introduced into the aeration vessel through the mouth of the partition and which provides a fluid conduit between the rigid tubular member in the clarifier chamber and the diffuser head. Thus, the flexible connector need only be of a type which is movable between a first position allowing the diffuser assembly to pass through the mouth of the partition and a second position wherein the diffuser can be, subject to weighting if necessary in a generally horizontal or parallel disposition, as qualified above with respect to the angular displacement included within the definition of parallel and/or horizontal vis-a-vis the bottom wall of the aeration vessel.

By way of example, in an actual unit having a mouth opening (32) of 10 inches, and an aeration tank diameter as measured generally at bottom wall 18 of 5 feet, a 6.5 inch section of 3 inch general purpose air and water non-conductive rubber hose connected to a 7 inch length of ¾ inch galvanized pipe was sufficient to maintain the diffuser head, which had a length of approximately 4.5 inches, in a generally parallel disposition relative to the bottom wall of the aeration vessel under a gas flow rate of 2.8 cfm. The diffuser head had a diameter of approximately 1.5 inches.

The foregoing description and examples illustrate selected embodiments of the present invention. In light thereof, variations and modifications will be suggested to one skilled in the art, all of which are in the spirit and purview of this invention.

What is claimed is:

1. In an aeration vessel used in an aerobic waste water treatment system, the aeration vessel having a bottom wall, a side wall and a top, a partition disposed in said aeration vessel, said partition having a downwardly opening mouth, said partition serving to divide said aeration vessel into an aeration chamber and a clarifier chamber, said clarifier chamber being located inwardly of said partition, the improvement comprising an aerator assembly extending into said clarifier chamber in said aeration vessel, said aerator assembly comprising a rigid tubular member having an upper end and a lower end, and a diffuser assembly, the diffuser assembly comprising a flexible connector and a diffuser head, the flexible connector connecting said diffuser head to said lower end and forming a fluid flow path between said diffuser head and said tubular member, said upper end being adapted to be connected to a source of an oxygen containing gas, said diffuser assembly having a weight sufficient to maintain said diffuser head generally parallel to said bottom wall.

2. The aeration vessel of claim 1, wherein said upper end of said tubular member is attached to a quick disconnect assembly.

3. The aeration vessel of claim 1, comprising a support in said aeration vessel attached to said tubular member.

4. The aeration vessel of claim 1, wherein said tubular member comprises a polymeric material.

5. The aeration vessel of claim 1, wherein said flexible connector comprises a section of flexible tubing having a first end connected to said lower end and a second end connected to said diffuser head.

6. The aeration vessel of claim 1, wherein said flexible connector comprises a swivel assembly.

7. The aeration vessel of claim 5, wherein said diffuser head is connected to said flexible tubing by a tubular metal section.

8. The aeration vessel of any one of claims 5 or 6, wherein said diffuser assembly comprises a standoff to space said diffuser head from said bottom wall.

9. The aeration vessel of claim 8, wherein said standoff is generally in line with said rigid tubular member.

10. The aeration vessel of claim 8, wherein said standoff is attached to said tubular metal section.

11. The aeration vessel of claim 1, wherein said partition has an inverted frustoconical wall.

12. In an aerobic waste water treatment system having an aeration vessel having a bottom wall, a side wall and a top, a partition disposed in said aeration vessel, said partition having a downwardly opening mouth, said partition serving to divide said aeration vessel into an aeration chamber and a clarifier chamber, said clarifier chamber being located inwardly of said partition, the improvement comprising an aerator assembly extending into said clarifier chamber in said aeration vessel, said aerator assembly comprising a rigid tubular member having an upper end and a lower end, and a diffuser assembly, the diffuser assembly comprising a flexible connector and a diffuser head, the flexible connector connecting said diffuser head to said lower end and forming a fluid flow path between said diffuser head and said tubular member, said upper end being adapted to be connected to a source of an oxygen containing gas, said diffuser head being positioned between said side wall and said mouth.

13. The system of claim 12, wherein said upper end of said tubular member is attached to a quick disconnect assembly.

14. The system of claim 12, comprising a support in said aeration vessel attached to said tubular member.

15. The system of claim 12, wherein said tubular member comprises a polymeric material.

16. The system of claim 12, wherein said flexible connector comprises a section of flexible tubing having a first end connected to said lower end and a second end connected to said diffuser head.

17. The system of claim 12, wherein said flexible connector comprises a swivel assembly.

18. The system of claim 16, wherein said diffuser head is connected to said flexible tubing by a tubular metal section.

19. The system of any one of claims 16 or 17, wherein said diffuser assembly comprises a standoff to space said diffuser head from said bottom wall.

20. The system of claim 19, wherein said standoff is generally in line with said rigid tubular member.

21. The system of claim 19, wherein said stand off is attached to said tubular metal section.

22. The system of claim 12, wherein said partition has an inverted frustoconical wall.

* * * * *